United States Patent
Durrey et al.

(10) Patent No.: US 7,921,192 B2
(45) Date of Patent: Apr. 5, 2011

(54) METHOD OF ASSIGNING NETWORK ADDRESSES IN AN IN-FLIGHT ENTERTAINMENT SYSTEM

(75) Inventors: Florent Durrey, Toulouse (FR); Frederic Trinquecoste, Toulouse (FR)

(73) Assignee: Thales (FR)

( * ) Notice: Subject to any disclaimer, the term of this patent is extended or adjusted under 35 U.S.C. 154(b) by 500 days.

(21) Appl. No.: 12/055,525

(22) Filed: Mar. 26, 2008

(65) Prior Publication Data

US 2008/0244048 A1  Oct. 2, 2008

(30) Foreign Application Priority Data

Mar. 27, 2007  (FR) ...................................... 07 02228

(51) Int. Cl.
G06F 15/16 (2006.01)
(52) U.S. Cl. .......................... 709/222; 709/220; 455/345
(58) Field of Classification Search .................. None
See application file for complete search history.

(56) References Cited

U.S. PATENT DOCUMENTS

| | | | |
|---|---|---|---|
| 6,929,218 B1 * | 8/2005 | Sanford et al. ............. | 244/118.5 |
| 7,319,854 B2 * | 1/2008 | vonDoenhoff et al. ....... | 455/345 |
| 2004/0213167 A1 * | 10/2004 | Garcia-Luna-Aceves et al. ............................. | 370/254 |
| 2006/0179457 A1 * | 8/2006 | Brady et al. .................... | 725/76 |
| 2006/0246892 A1 | 11/2006 | Vondoenhoff et al. | |
| 2007/0061847 A1 * | 3/2007 | Callahan et al. ................ | 725/76 |
| 2008/0096614 A1 * | 4/2008 | Venkatachalam ............. | 455/574 |
| 2008/0104642 A1 * | 5/2008 | Galipeau et al. ................ | 725/76 |

OTHER PUBLICATIONS

U.S. Appl. No. 11/969,841, filed Jan. 4, 2008, Florent Durrey et al. (Not Yet Published).
U.S. Appl. No. 12/041,813, filed Mar. 4, 2008, Florent Durrey et al. (Not Yet Published).

* cited by examiner

Primary Examiner — Bunjob Jaroenchonwanit
(74) Attorney, Agent, or Firm — Lowe Hauptman Ham & Berner, LLP

(57) ABSTRACT

In an in-flight entertainment system implementing a wireless link between a network server S and wireless processing units $SDB_{i,j}$ which each serve the individual devices of a plurality of seats $GS_{i,j}$ of one and the same row, an identification i of the column in which a wireless processing unit $SDB_{i,j}$ is positioned is carried out by providing for a sequential powering-up ($PW_i$_on) of the columns, the powering-up of a column $col_i$ triggering at this instant known to the server the boot process BP for the devices $SDB_{i,j}$ of this column, enabling the column to be identified i by a local duration measurement $b_{i,j}$ supplied by an internal clock $DT_{i,j}$ of these devices previously initialized at a known instant of the boot process BP.

9 Claims, 4 Drawing Sheets

METHOD OF ASSIGNING NETWORK ADDRESSES IN AN IN-FLIGHT ENTERTAINMENT SYSTEM

RELATED APPLICATIONS

The present application is based on, and claims priority from, French Application Number 07 02228, filed Mar. 27, 2007, the disclosure of which is hereby incorporated by reference herein in its entirety.

FIELD OF THE INVENTION

The present invention relates to a method of assigning network addresses in an in-flight entertainment system (IFE system) onboard an aircraft, based on a wireless data distribution network.

STATE OF THE ART

The most recent in-flight entertainment systems use wireless data transmission techniques, which make it possible to reduce the connection problems and enhance the personalized service offer for long-haul flights: video on demand, Internet access, electronic mail, and so on.

A basic architecture of an in-flight entertainment IFE system of an aircraft comprises a set of networked processing units SDB (Seat Data Boxes). Each distribution unit SDB serves individual devices, such as a flat screen, a remote control, a power outlet for laptop computer, and so on, installed in each seat of a group of passenger seats, normally passenger seats of one and the same row, which are positioned side by side, either between two aisles or between an aisle and a wall of the cabin. A processing unit can thus for example serve two, three or four passenger seats. Each unit is positioned under a seat of the group that it serves and typically includes a port to an onboard electrical power supply network.

The groups of seats are divided up into columns. The processing units of one and the same column are powered by a corresponding power distribution column. Each processing unit SDB communicates with a network server by means of at least one access point.

To enable personalized services to be offered to each seat, a network address must be assigned to each of the devices in the network, that is, in particular, to the processing units and to the individual devices. This is done when the IFE system is first set up in a given aircraft, and each time a device is changed (for maintenance). This network address assignment sequence requires in particular the knowledge by the server of the position of each device in the network: which seat of a group, which group of seats, in which column.

Normally, once the processing units are identified and configured, each individual device is identified and configured by the processing unit that serves it, with no particular problems.

When it comes to the identification and the configuration of the processing units in a wired network, identifying the position of a processing unit in a column poses no particular problem. It can be done in a known manner by a step-by-step determination technique, using a "network discovery" procedure, as described in the IEEE 802.1AB standard.

It is the identifying of the column in which the unit is positioned that raises a few difficulties. In the wired ETHERNET type IFE architectures, each column was connected to a specific data input/output port of the server via a wired ETHERNET link: the first processing unit just after the port thus obtained the identification of the column (the port identifying the column), information that was propagated step by step to all the units in the column. In the case of wireless links, this mechanism can no longer be applied: the server has a single wireless input/output interface via which all the data from all the columns passes (via an access point).

In this case, according to the state of the art, the identification of the column is obtained by powering up only a single column at a time, which makes it possible to establish a one-to-one link between the single column that is powered and the processing units that are powered up. This enables each processing unit to determine its position: the associated column is the column that is powered up, information supplied by the server; the position in the column is obtained by the usual step-by-step determination technique based on sending/receiving messages with the network server during the boot process triggered in the processing unit by the action of powering up. The duration of the sequence of assigning addresses to the processing units is then equal to the duration of the boot sequence for a column multiplied by the number of columns. This duration depends typically on the duration of the boot sequence of each of the processing units, typically a few minutes. In practice, in an aircraft in which all the seats are equipped with an IFE system, an assignment sequence can take approximately one hour (16 columns.4 minutes).

The aircraft manufacturers' specifications indicate a duration that should generally not exceed 10 minutes. The duration of the process must therefore be reduced.

SUMMARY OF THE INVENTION

The invention proposes a technical solution to this column identification problem in a wireless IFE system.

The idea on which the invention is based is to power up the columns one after the other, with a time delay between each powering-up of known duration, without waiting for the end of the process of booting up the wireless processing units in each column. The time delay is chosen to make it possible to reliably determine for each processing unit, the associated column, based on a time of reception by the network server of a message sent by each processing unit and which contains the duration of the boot process after initialization of the processing unit's internal clock. This determination is possible because the duration between the moment of activation of the boot process of a processing unit, by powering up the corresponding column, and the moment of activation of the initialization of the internal clock is roughly the same for each processing unit of the IFE system: it can be estimated by an average value, with a tolerance for which the maximum value can be estimated, for a given product line (the product being the processing unit). Furthermore, it is sufficient to choose the time delay value between two power-ups to be sufficiently great given this variation, the duration of the time delay not being critical in the duration of the inventive identification process.

Thus, by sequencing the powering-up of the columns, the duration of the column identification process is considerably reduced, and the time of reception of each of the messages by the server together with the duration transmitted in the corresponding message makes it possible to distinguish one column out of the n columns of the system.

As characterized, the invention therefore relates to a method of assigning a network address to each of the wireless devices of a network in an aircraft, said devices being able to exchange messages with a network server via at least one access point, each device being placed in the position of a seat in a column of seats and powered by a power supply column specific to the associated column, characterized in that said method comprises a process of identification, by the server of the column of seats, of each of said wireless devices, said process comprising a sequential powering-up of the wireless devices, for each column, with a time delay of known duration between the powering-up in one column and the powering-up in a next column, said powering-up of a device triggering a mechanism for sending a message to the server, containing a time indication specific to the device, the timestamp by the server of the instant at which the message was received and the identification by the server of the column of the device having sent the message based on said time indication and said timestamp.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DESCRIPTION OF THE INVENTION

Figure 1:
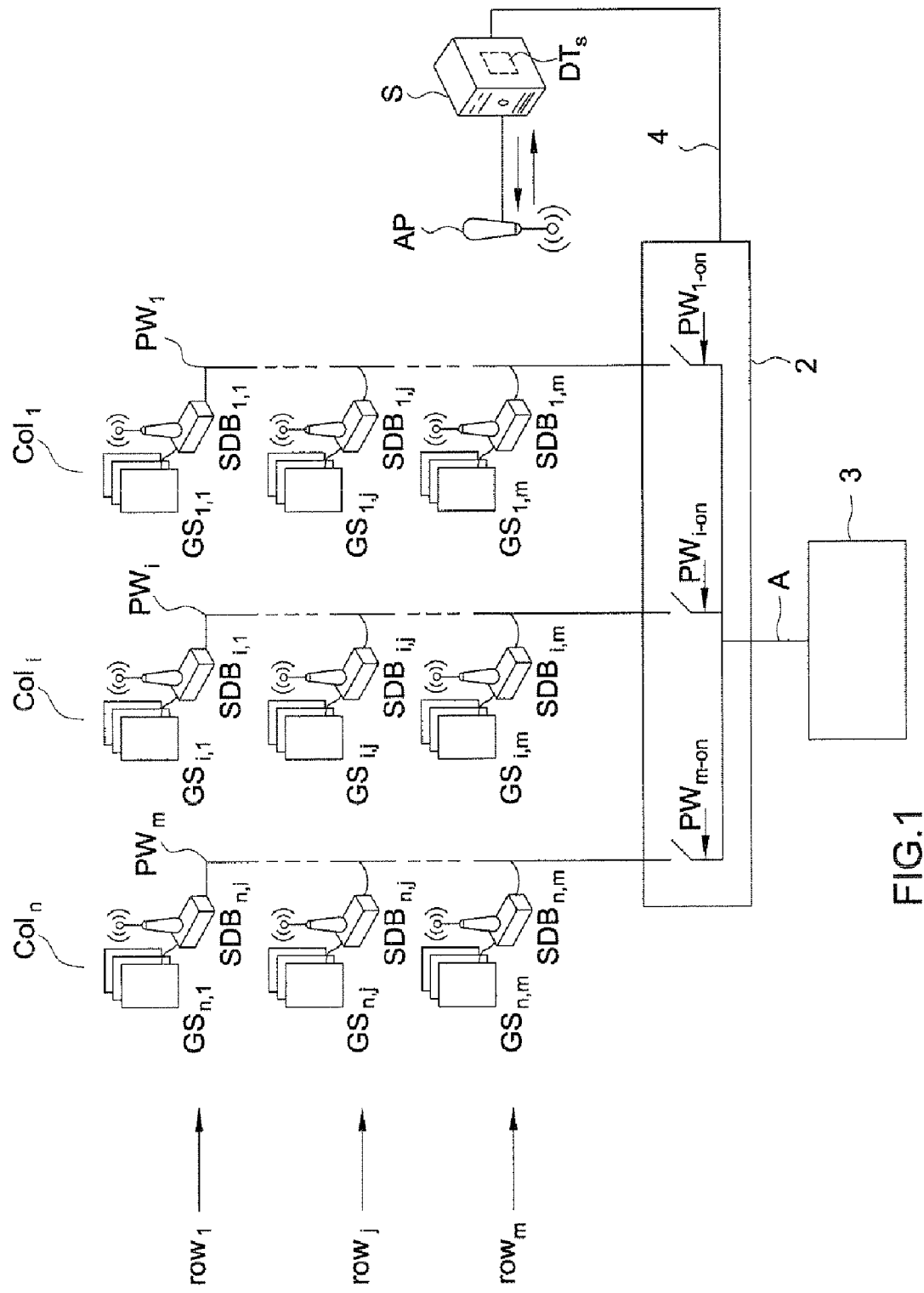
FIG. 1 illustrates a simplified wireless network architecture of the processing units of an IFE system.

FIG. 1 is a simplified illustration of an architecture of a wireless IFE system making it possible to implement an inventive process for identifying the column of each of the wireless processing units $SDB_{i,j}$ ($i \in [1, \ldots n]$, $j \in [1, \ldots m]$, i, j being integer numbers) of the system.

This system comprises a server S, at least one access point AP, linked to the server by a wired network link 1 (an Ethernet cable for example), and wireless processing units $SDB_{i,j}$.

Each processing unit $SDB_{i,j}$ serves the individual devices of an associated group of seats ($GS_{i,j}$).

The position of each wireless processing unit $SDB_{i,j}$ can be defined by an identifier i of the column $col_i$ in which it is located and an identifier j of the row $row_j$ in which it is located.

Each column coli has a corresponding specific power supply column $PW_i$ which powers each of the processing units $SDB_{i,j}$ of this column.

The system according to the invention comprises means 2 able to switch the power supply Δ provided by a generator 3 to each of the power supply columns $PW_i$, individually, column by column or simultaneously, under the control of the server S which controls the means 2, for example via a specific link 4, in the wired example. For example, the means 2 are implemented by a set of power switches, one switch for each power supply column $PW_i$. The activation of a corresponding switching signal $PW_i$-on closes the switch and provokes the powering-up of all the processing units $SDB_{i,j}$ connected to this column.

The processing units $SDB_{i,j}$ can exchange data with a network server S via at least one wireless access point AP. In practice, the IFE system will normally include a number of access points, located in different areas of the aeroplane, each processing unit being able to set up a wireless link with the access point that it best receives.

The server S supplies the requested services such as video on demand, Internet connectivity or other personalized services. It comprises an internal clock $DT_S$, which enables it in particular to provide an event time-stamping function.

The processing units also each include an internal clock $DT_{i,j}$, able to supply local time information (timestamping).

In such an architecture, a network address assignment sequence SEQ-AD-IP normally activated on first commissioning of the IFE system or by a maintenance operation, calls an identification process PISDB according to the invention, to enable each wireless processing unit $SDB_{i,j}$ of the system to identify the column in which it is located.

This identification process according to the invention will be explained in an exemplary implementation, in relation to FIGS. 2, 3 and 4.

Figure 2:
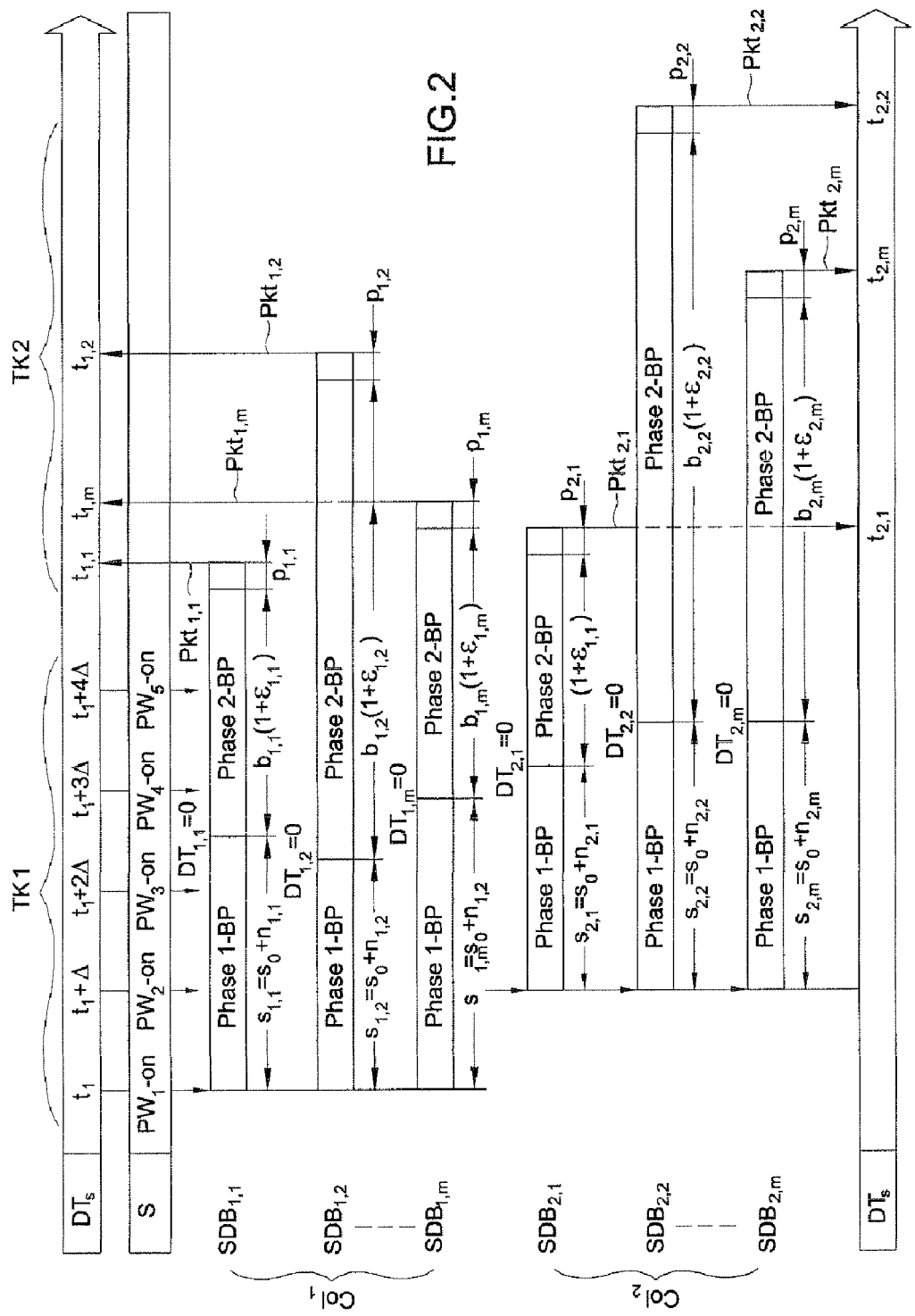
FIG. 2 is a timing diagram illustrating the process of sending and receiving messages between the processing units and the server according to the column powering-up times.
Figure 3:
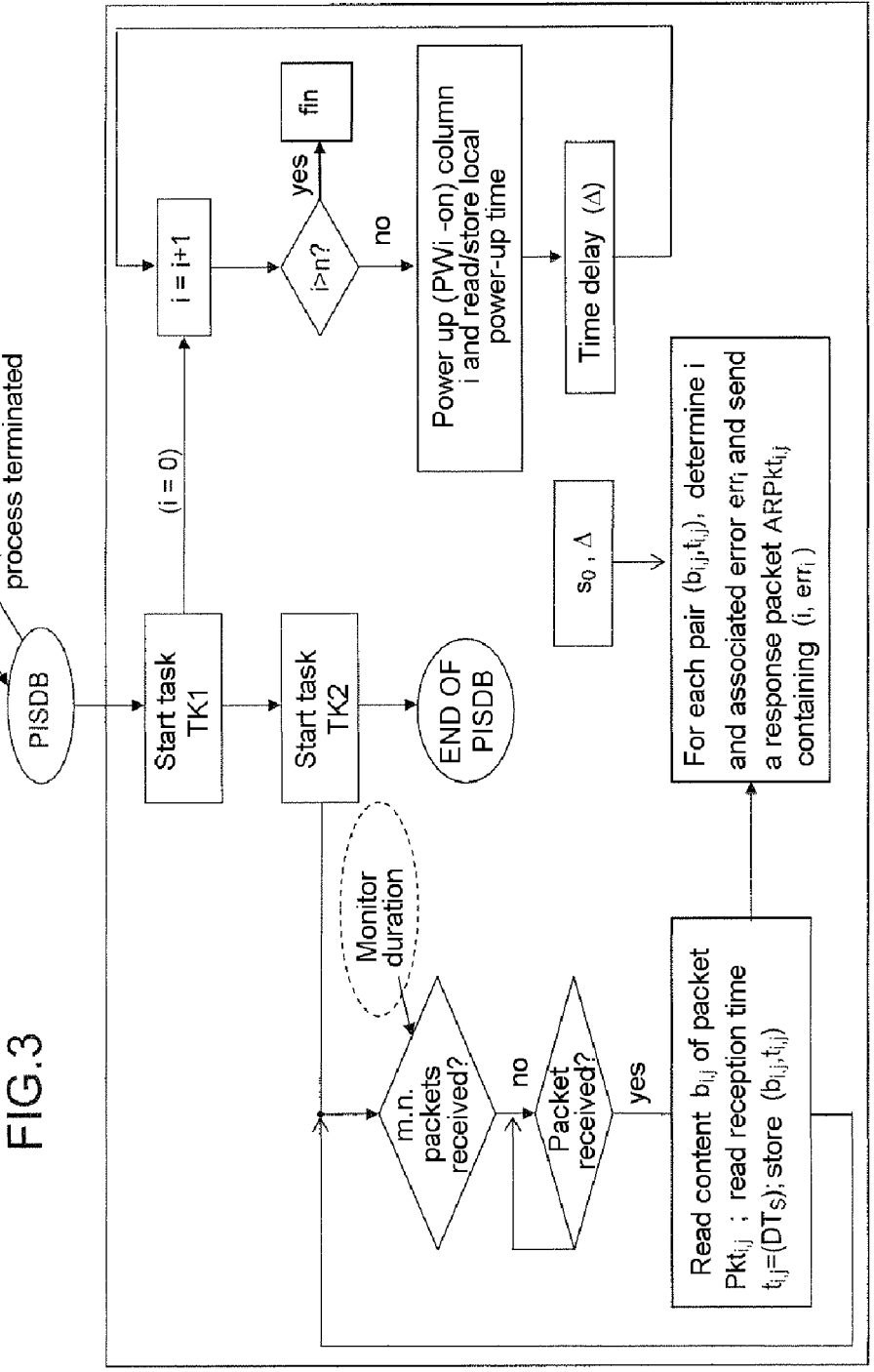
FIG. 3 illustrates the identification process activated in the server, by a network address assignment sequence.
Figure 4:
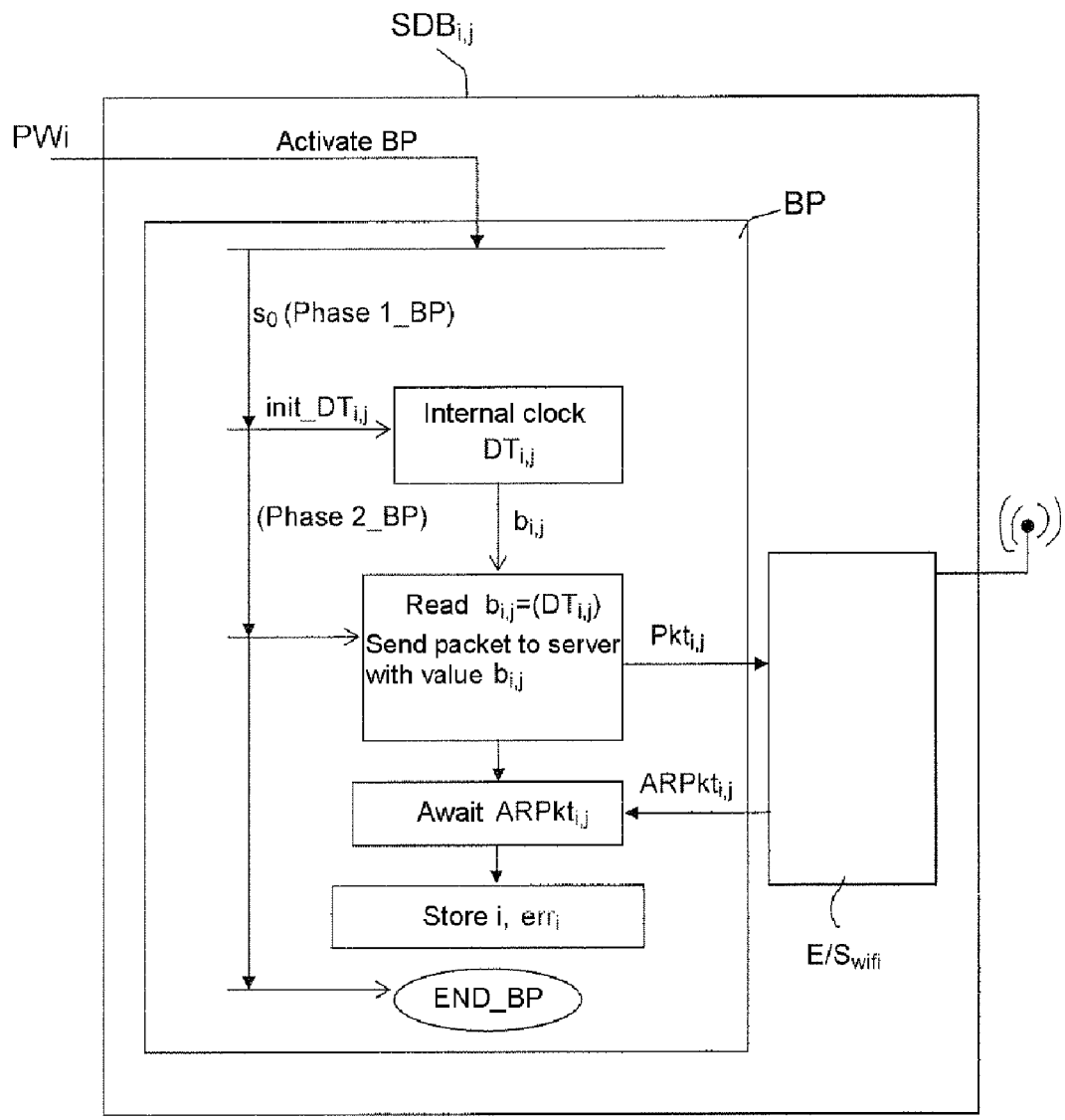
FIG. 4 illustrates the tasks of the identification process activated in a processing unit by the powering up of the associated column.

The identification process PISDB is triggered in the server which then runs two tasks in succession, as illustrated in FIGS. 2 and 3, a first task TK1, then a second task TK2, which are executed in parallel. Typically, the second task is run less than a second after the first task.

The first task TK1 consists in sequentially powering up the columns Coli, with a time delay Δ between two successive columns.

Take, for example, as illustrated in FIGS. 2 and 3, a constant time delay Δ. $t_1$ is used to denote the moment of powering-up of the first column $col_1$. The next column $col_2$ is powered up at the time $t_2=t_1+\Delta$; the ith column is powered up at the time $t_i=t_1+(i-1)$. Δ; and the nth column at the time $t_n=t_1+(n-1)$. Δ. The first task TK1 is then terminated.

In more detail, as illustrated in FIG. 3, the task TK1 is typically performed in the server by a loop for sequentially powering up the columns of the network one after the other, which can be expressed:

a). for i=0 to n−1:
　i=i+1
　Application of the voltage to the column $Col_i$, typically by switching the power supply to the power supply column $PW_i$; storage of the corresponding powering-up moment $t_i$ (current value of the internal clock DTs).
　time delay with a duration Δ before returning to a).

The powering-up of a processing unit $SDB_{i,j}$ usually triggers a boot process BP.

This process BP generally comprises (FIG. 4) a first phase Phase 1_BP, typically hardware, corresponding to the correct initialization of the various circuits /components, etc., and which usually ends with an initialization of the internal clock init_$DT_{i,j}$ which triggers the initiation of a second phase Phase 2-BP, typically a software and applications initialization phase.

The first phase Phase 1-BP normally has a fixed duration so from activation, whereas the second phase can vary from one processing unit to another. This variation is due to a number of effects: different access times to various services, "software ageing" process in which the applications take longer and longer to start up, different temperatures and therefore speeds, and, above all, periodic but not systematic verification of certain systems and in particular periodic verification of the integrity of the flash memory, which is time-intensive.

Thus, the duration of the first phase of the process ($s_0$) is known by default (characteristic of the product). The duration of the second phase of the boot process can be known by reading the current value $b_{i,j}$ of the internal clock at the end of the boot process.

According to the invention, at the end of the boot process, the processing unit sends, via its wireless interface $E/S_{wifi}$, a packet $Pkt_{i,j}$ containing the value $b_{i,j}$ (FIGS. 2, 3, 4), and waits in return for a packet from the server $ARPkt_{i,j}$ which contains the identification i of the column in which this unit $SDB_{i,j}$ is located.

The second task TK2 (FIGS. 2 and 3) activated consists, for the server S:

a) in awaiting packets sent by the processing units, and
b) each time a packet $Pkt_{i,j}$ is received; in reading the transmitted value $b_{i,j}$; in reading the moment of reception $t_{i,j}$ of this packet in its internal clock $DT_S$; in determining the identifier i of the column of the processing unit that has sent this packet according to ($s_0$, $t_{i,j}$, $b_{i,j}$, $\Delta$); and in returning a packet $ARPKT_{i,j}$ in response, containing this identifier i.

In more detail, as illustrated in FIG. 3, the second task TK2 comprises:

a wait to receive packets;
on each packet $Pkt_{i,j}$ received from a sending processing unit $SDB_{i,j}$, storage of the transmitted value $b_{i,j}$, and of the local time $t_{i,j}$ of reception of this packet by the server;
for each pair ($b_{i,j}$, $t_{i,j}$), determination of the corresponding value of i according to the values $b_{i,j}$ and $t_{i,j}$, of the moment $t_1$ of powering up of the first column, of the time delay value $\Delta$ and of the average duration $s_0$ of the boot process between the activation of the process and the initialization of the internal clock;
sending of the determined value i to the sending processing unit $SDB_{i,j}$ in acknowledgement $ARPkt_{i,j}$ of the packet sent $Pkt_{i,j}$.

According to the invention, the server determines i from the following equation (i being rounded to the nearest integer):

$$i=(t_{i,j}-t_1-b_{i,j}-s_0)/(\Delta+1).$$

Identifying the column thus amounts to a simple calculation, by assigning as column identifier the rank i of this column in the powering-up sequence.

This equation results in fact from an approximation of the calculation of the duration $t_{i,j}$, which disregards the following terms which are noted in the timing diagram of FIG. 2:

the duration $p_{i,j}$ which corresponds to the propagation time of the message $Pkt_{i,j}$ between the sending by the processing unit and its reception by the server at the time $t_{i,j}$.

the duration $s_{i,j}=s_0+\eta_{i,j}$: so is the average value of the duration of the first phase of the boot process BP. It is known for a given product line. $s_{i,j}$ corresponds to the true duration, $\eta_{i,j}$ being the variation (positive or negative) relative to the average value.

the true duration equal to $b_{i,j}\cdot(1+\epsilon_{i,j})$ of the second phase of the boot process BP, where $\epsilon_{i,j}$ represents the drift of the internal clock of the processing unit relative to the internal clock $DT_S$ of the server which serves as a time standard.

To take the example of the processing unit $SDB_{1,2}$: as illustrated in FIG. 2, the value $t_{1,2}$ of the moment of reception of the packet $Pkt_{1,2}$ sent by $SDB_{1,2}$ on completion of the boot process BP can be expressed:

$$t_{1,2}=[t_1+\Delta]+s_{1,2}+b_{1,2}(1+\epsilon_{1,2})+p_{1,2},$$

where, it will be recalled, $t_1$ is the local time, supplied by the internal clock of the server S, of the start of the task TK1 for sequentially powering up the columns, that is, powering up the first column $col_1$ (i=1).

More generally, the value $t_{i,j}$ of the moment of reception of the packet $Pkt_{i,j}$ sent by $SDB_{i,j}$ on completion of the boot process BP activated at the moment $t_1+(i-1)\Delta$ is expressed:

$$t_{i,j}=[t_1+(i-1)\Delta]+s_{i,j}+b_{i,j}(1+\epsilon_{i,j})+p_{i,j}.$$

We then have: $i=(t_{i,j}-t_1-s_0-\eta_{i,j}-b_{i,j}(1+\epsilon_{i,j})-p_{i,j})/(\Delta+1)$, which can also be expressed:

$$i=[(t_{i,j}-t_1-b_{i,j}-s_0)/(\Delta+1)]-[(\eta_{i,j}+p_{i,j}+b_{i,j}\epsilon_{i,j})/\Delta] \quad (EQ1.)$$

first term    second term $t_{i,j}$, $t_1$, $b_{i,j}$, $\Delta$ and $s_0$ are values known to the server S: it was able to memorize $t_{i,j}$, $t_1$ which was supplied to it by its internal clock $DT_S$; $b_{i,j}$ was transmitted to it by the processing unit; $\Delta$ and $s_0$ are parameters of the identification process, defined by default according to the processing units SDB used in the IFE system (product characteristic).

To calculate i reliably on the basis of the first term, the second term must be negligible compared to 1, or:

$$(\eta_{i,j}+p_{i,j}+b_{i,j}\epsilon_{i,j})<<\Delta.$$

In the invention, it was possible to show that this was the case, provided that $\Delta$ was taken to be sufficiently great compared to $\eta_{i,j}$ which is the predominant error in the system.

In practice, it was possible to verify that the drift $\epsilon_{i,j}$ between the clocks $DT_{i,j}$ and $DT_S$ is no more than 50 ppm (parts per million). In a practical example, for a given product line, it was possible to measure that the duration $b_{i,j}$ was no more than 240 s which would give a maximum error ($b_{i,j}\epsilon_{i,j}$) due to the drift equal to 12 milliseconds.

Regarding the propagation, at the moment of activation of the identification process PISDB, the network is not loaded. In these conditions, it was possible to verify, in a practical example, that the maximum value of the propagation time $p_{i,j}$ was 10 milliseconds (worst case).

Finally, by taking a value of the order of 10 times the value of $\eta_{i,j}$ for $\Delta$, it can be shown that $\eta_{i,j}$ can be disregarded and i can be obtained with a high reliability from just the first term of the equation EQ1, without this being critical to the duration of the identification process PISDB, and therefore of the network address assignment sequence.

The value of $\eta_{i,j}$ is typically dependent on the product (processing unit SDB). For a given product line, the average value so can be calculated, as can the maximum variation around this average value ($\eta_{i,j} \leq \eta$). In a practical example, we obtained s0=46 seconds, and $\eta$ equal to 1 second (worst case). By taking $\Delta$=10 seconds, it was possible to identify i reliably from just the first term of the equation EQ1.

If $\eta$ was much more reliable, for example of the order of 0.1 s, it would be possible to take, for example, $\Delta$=1 second. However, the resulting saving on the duration $d_\Delta$ of the process would not be very great. In practice, the following applies:

$$d_\Delta = \Delta \times \text{number } n \text{ of columns+maximum time of the boot process } BP.$$

In a numeric example, by uprating the duration of the boot process BP of the processing units by 240 seconds (4 minutes) and with an architecture of n=16 columns, it would take for $\Delta$=10 s, $d_\Delta$<400 s or 6 min 40 s; and for $\Delta$=1 s, $d_\Delta$<260 s or 4 min 20 s.

In the invention, it is thus shown that a value of 10 or so seconds to a few tens of seconds can be taken for the time delay $\Delta$, without this being critical to the overall duration of the identification process according to the invention, a value that makes it possible to obtain a high reliability in the determination of i based on the first term of the equation EQ1.

The column identification process according to the invention thus involves the processing units $SDB_{i,j}$ and the server S, by using their internal clocks.

As a general rule, the process according to the invention therefore comprises:

a). a sequential powering-up of the processing units $SDB_{i,j}$, for each column, with a time delay of known duration $\Delta$ between the powering-up in one column i and the powering-up in a next column i+1, said powering-up of the ith column $col_i$ triggering, at the moment of power-up $t_i$ ($=t_1+(i-1)\Delta$) in each processing unit $SDB_{i,j}$ of the column, a boot process BP comprising an initialization $init\_DT_{i,j}$ of an internal clock $DT_{i,j}$;

b). after said initialization of its internal clock, a sending to the network server S of at least one acknowledgement packet $Pkt_{i,j}$ by a processing unit $SDB_{i,j}$, the acknowledgement packet $Pkt_{i,j}$ containing the current value $b_{i,j}$ of the internal clock $DT_{i,j}$ at the moment of sending of the packet;

c). an identification by the network server of the column of a processing unit $SDB_{i,j}$ on receipt of an acknowledgement packet $Pkt_{i,j}$ from this device, based on the current value $b_{i,j}$ contained in this packet and the time of reception of this packet by the server supplied by its own internal clock $DT_S$.

The processing unit $SDB_{i,j}$ uses a packet sending mode of the type with confirmation of receipt of a packet, and sends a new packet at predetermined intervals containing the corresponding current value of said timestamping device, until a corresponding confirmation of receipt is received.

The server sends an identification i of the column to the device sending an acknowledgement packet $Pkt_{i,j}$, in an acknowledgement $ARPkt_{i,j}$ of this packet.

In practice, the sending of the packet can correspond to the completion of the boot process BP. It is generally a moment or a reference action in the boot process, after the initialization of the internal clock, and after the initialization of the wireless link (for the packets $Pkt_{i,j}$ to be able to be received by the server).

The moment of sending of the packet $Pkt_{i,j}$ is thus advantageously the end of this boot sequence BP, which generally corresponds to the activation of the initialization of the wireless link, and the duration $b_{i,j}$ thus corresponds to the duration of phase 2 of the boot process BP. In a practical example, it was possible to evaluate $b_{i,j}$ as varying from one unit to another between 180 and 200 seconds (but longer values are possible).

Choosing the end of the process BP for the sending of the packet provides for a simple practical implementation of the invention, with an identified moment that is the same for all the units independently of their software configurations.

However, this sending moment could be any moment in the second phase of the boot process, provided that this moment is chosen after initialization of the link to the server (for the packets $Pkt_{i,j}$ to be able to be transmitted).

In practice, to enable the network link with the server while the network address assignment sequence SEQ-AD-IP is in progress, provision is made for the processing unit to use, for the exchange of the messages $Pkt_{i,j}$ and $ARPkt_{i,j}$, a single temporary network address. Such a temporary address can be obtained in a known way, for example via a server implementing a DHCP protocol (Dynamic Host Configuration Protocol), which enables temporary IP addresses to be automatically assigned to the devices of a local area network. The prior verification of the availability of the wireless link between the units SDB and the server S before the exchange of packets $Pkt_{i,j}$ and $ARPkt_{i,j}$ will typically be based on the standardized request well known by the term "ping": according to this request, the server must send corresponding response messages to the message sent by the processing unit.

Since the local area network associated with the IFE system of the aircraft generally implements a security protocol, for example a WPA (WiFi Protected Access) type protocol making it possible to authenticate the users on the network and define their access rights, means will generally have to be provided for the processing units SDB to be able to open a link with an access point while the network address assignment sequence is in progress. For example, it is possible to envisage that, during the IP address assignment sequence, the access points are configured to communicate in non-encrypted mode. Moreover, since knowing the name of the network ESSID, or SSID (Service Set Identifier) is necessary for a wireless device to be connected to the network, provision can be made to distribute to the processing units SDB the SSID identifiers of the access points of the IFE system. Another alternative is to provide for the identifiers ESSID of each of the access points of the IFE network, and the encryption key of the security protocol, to be hard-written into each processing unit and into each access point. These various considerations typically depend on the hardware and software specifics of the IFE system to which the invention is to be applied and can be resolved with no particular difficulties by those skilled in the art, for the wireless links to be possible during the network address assignment sequence.

It should finally be noted that, generally, provision is made for a synchronization of the internal clocks of the processing units of an IFE system. In this case, this synchronization will be performed only after the network address assignment sequence.

Other practical considerations will generally have to be allowed for, notably in the case of failure: failure of the attempt to send a packet, failure to identify a column for a unit.

For example, it may be that a processing unit has failed and sends no packet $Pkt_{i,j}$. The server should normally receive m.n packets, one for each module. A monitoring module can then be associated with the packet wait step, which can, for example, provoke the end of the task TK2 and generate an error code, if the waiting time for all of the m.n packets becomes too great.

It may also be that a processing unit does not manage to set up a wireless link with an access point. In this case, allowance is made for it to perform a certain number of attempts to send the packet $Pkt_{i,j}$.

It may also be that the server does not manage to calculate i, for a given processing unit. In this case, allowance can be made for it to return a particular value, for example 255. This could in particular be the case if the second term of EQ1 (error) was too great relative to a fixed limit.

The practical implementation means require a device making it possible to power up the columns in sequence, or typically a device 2 with power switches with programmable command input (FIG. 1), and the integration of the particular tasks of the method that have been described, in particular the various measurements/storage of the values of the internal clocks, sending/awaiting packets and their content.

For a given IFE system, it entails storing parameters of the identification process, namely the average duration so of the first phase phase 1_BP of the boot process BP of the processing units, and the time delay value $\Delta$ used. According to one aspect of the invention, since hardware ageing can lead to a modification over time of the value of so, even of $\eta_{i,j}$, allowance is made for the values of $s_0$ and $\Delta$ to vary over time, whether they are modified manually, or automatically (ageing law, parameter tables based on system operating time, etc).

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. A method of assigning a network address to each wireless device of a network in an aircraft, said wireless devices being able to exchange messages with a network server via at least one access point, each wireless device being placed in a position of a seat in a column of seats and powered by a power supply column specific to the associated column, wherein said method comprises the steps of:
   sequentially powering-up wireless devices, for each column of seats, with a time delay of known duration between the powering-up in one column and the powering-up in a next column;
   each one of the wireless devices sending a corresponding message to a network server, the corresponding message having a time indication specific to the wireless device, the sending of the corresponding message triggered by the powering-up of the corresponding wireless device;
   the network server receiving the corresponding messages from the wireless devices and time stamping each of the corresponding messages with a corresponding timestamp based on an instant at which each of the messages is received;
   the network server identifying a column of seats of each of the wireless devices based on the time indication specific to the wireless device and the corresponding timestamp.

2. The method of assigning a network address to each of the wireless devices of a network in an aircraft, according to claim 1, in which said time delay is from ten seconds to a few tens of seconds.

3. The method of assigning a network address to each of the wireless devices of a network in an aircraft, according to claim 1, in which said sequential powering-up triggers in a wireless device:
   a). a boot process comprising an initialization of an internal clock,
   b). after said initialization, sending to the network server of at least one acknowledgement packet by said wireless device, said at least one acknowledgement packet comprising a current value of the internal clock of said wireless device at the moment of said sending the at least one acknowledgement packet and wherein the identification by the network server of the column of seats of the wireless device on reception of the at least one acknowledgement packet from the wireless device is performed on the basis of said current value contained in said at least one acknowledgement packet and the time of reception of said at least one acknowledgement packet supplied by the internal clock of the network server.

4. The method according to claim 3, in which each wireless device uses a packet sending mode of a type with packet receipt confirmation, and sends at determined intervals a new packet containing the corresponding current value of the internal clock, until a corresponding confirmation of receipt is received.

5. The method according to claim 3, in which the network server sends a column identification i to the wireless device sending the at least one acknowledgement packet in an acknowledgement of said at least one acknowledgement packet.

6. The method according to claim 3, such that, when an identification process is triggered, the network server executes the following steps:
   a) activation of a loop for sequentially powering up wireless devices in columns of seats;
   b) for i=0 up to n, n being an integer number corresponding to the number of columns:
      i) i=i+1
      ii) powering up of the column i;
      iii) time delay, for a time delay duration then return to b)
   c) for each received packet, storage of the current value transmitted in said received packet and of the local time of reception of the received packet by the network server;
   d) for each pair (local reference value, local reception time), determination of an associated column number i.

7. The method according to claim 6, in which said column identification is given by the rank i of the column in the sequential powering-up loop and said column identification is performed by means of calculating the following equation:
   $i = (t_{i,j} - t_1 - b_{i,j} - s_0) / (\Delta + 1)$, where $s_0$ is the average duration of a duration of the boot process of a wireless device between the instant at which the boot process is activated and the initialization of the internal clock of the wireless device, and $t_1$ is the instant when the first column is powered up by the sequential powering-up loop.

8. The method according to claim 7, in which the values $s_0$ and $\Delta$ vary according to a system operating time.

9. In-flight entertainment system comprising a network server and wireless devices able to exchange messages with the network server via at least one access point, each wireless device being placed in the position of a seat in a column of seats and powered by a power supply column specific to the associated column, the network server supplies each wireless device with an identification of the column in which the wireless device is placed, by applying an address assignment process according to claim 1.

* * * * *